(12) United States Patent
Murayama

(10) Patent No.: US 6,643,514 B1
(45) Date of Patent: Nov. 4, 2003

(54) CALL DISTRIBUTION FOR A RADIO EXCHANGE STATION IN A MOBILE COMMUNICATION SYSTEM

(75) Inventor: Yuichi Murayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,337

(22) Filed: Dec. 23, 1999

(30) Foreign Application Priority Data

Dec. 25, 1998 (JP) .......................................... 10-370744

(51) Int. Cl.⁷ .......................... H04Q 7/00; H04M 3/00; G06F 15/16
(52) U.S. Cl. ...................... 455/450; 455/453; 455/509; 376/329
(58) Field of Search ................................ 455/453, 445, 455/450, 560, 561, 554, 555, 509, 451, 452.2, 423; 370/328, 329, 431, 335, 336, 341

(56) References Cited

U.S. PATENT DOCUMENTS

| | | | | |
|---|---|---|---|---|
| 3,564,150 A | * | 2/1971 | Muller ........................ | 455/450 |
| 5,436,955 A | * | 7/1995 | Kaewell et al. .............. | 455/561 |
| 5,787,358 A | * | 7/1998 | Takahashi .................... | 455/450 |
| 6,002,665 A | * | 12/1999 | Choe .......................... | 370/217 |
| 6,226,518 B1 | * | 5/2001 | An ............................... | 455/561 |
| 6,233,447 B1 | * | 5/2001 | Tomoike ...................... | 455/445 |
| 6,252,950 B1 | * | 6/2001 | Duty et al. .................. | 379/111 |
| 6,459,902 B1 | * | 10/2002 | Li et al. ...................... | 455/453 |
| 2001/0005678 A1 | * | 6/2001 | Lee ............................. | 455/445 |
| 2002/0187777 A1 | * | 12/2002 | Osterhout et al. .......... | 455/417 |

FOREIGN PATENT DOCUMENTS

| | | |
|---|---|---|
| JP | 5-89055 | 4/1993 |
| JP | 7-298340 | 11/1995 |
| JP | 8-287032 | 11/1996 |
| JP | 10-65728 | 3/1998 |

* cited by examiner

Primary Examiner—Nguyen T. Vo
Assistant Examiner—Kamran Afshar
(74) Attorney, Agent, or Firm—Sughrue Mion, PLLC

(57) ABSTRACT

In a radio exchanging station comprising a selection processing execution processor and first through N-th call processing execution processors, an n-th call processing execution processor ($1 \leq n \leq N$) periodically delivers, to the selection processing execution processor, an n-th use condition signal indicative of an n-th use condition of an n-th radio resource managed by the n-th call processing execution processor and an n-th load condition signal indicative of an n-th load condition of the n-th call processing execution processor. On the basis of first through N-th use conditions and first through N-th load conditions, the selection processing execution processor determines first through N-th call reception permissible numbers for distributing to the first through the N-th call processing execution processors, respectively.

15 Claims, 6 Drawing Sheets

CALL DISTRIBUTION FOR A RADIO EXCHANGE STATION IN A MOBILE COMMUNICATION SYSTEM

BACKGROUND OF THE INVENTION

This invention relates to a radio exchanging station carrying out a call control in a plurality of processors and, more particularly, to a call distributing method for carrying out distribution for traffic of the radio exchanging station to avoid a congestion state in each processor.

A conventional radio exchanging station comprises a plurality of call control processors and a call control monitoring processor. The call control monitoring processor is called a congestion control processor. In a case where the radio exchanging station carries out call control for the call control processors, a call distribution method is carried out as follows. That is, the call control monitoring processor (the congestion control processor) monitors congestion states of the respective call control processors. When a particular call control processor is put into the congestion state, a request of the call control from the call control monitoring processor to the particular call control processor is regulated. Accordingly, the conventional call distributing method is disadvantageous in that call distribution to the call control processor in question increases and it results in adversely effecting other call control processors. Accordingly, the conventional radio exchanging station may carry out an unstable call control.

Various prior arts related to this invention are already known. By way of example, Japanese Unexamined Patent Publication (JP-A) of Tokkai No. Hei 7-298,340 or JP-A 7-298340 discloses a mobile communication system and a mobile station, which are capable of enabling first through fourth items, i.e., the setting of whether a speech channel is switched or not by a mobile station user, the early detection of an illegal mobile station, the avoidance of convergence of call control processing at a base station control station, and the avoidance of convergence of a simultaneous call channel. According to JP-A 7-298340, for the first item, a mobile station is provided with an arrangement which informs a user that a speech channel switching factor is detected on a mobile network side and a switch which enables the user to select whether a telephone call can be selected, thereby enabling the intention of the user to be transmitted to the network side. For the second item, the cumulative telephone charge is totalized individually on the network side and mobile station side and compared with each other to find the illegal mobile station. For the third item, the number of base stations controlled by the base station control station is varied dynamically in real time according to the convergence state. For the fourth item, the number of radio zones constituting position registration areas is varied in real time according to the load state of call processing, etc., to places peripheral position registration areas in partial charge of a load.

Japanese Unexamined Patent Publication (JP-A) of Tokkai No. Hei 8-287,032 or JP-A 8-287032 discloses a communication management system for multi-processor system, which is capable of reliving a congestion state by the mutual communication processing of a plurality of processors by providing each processor with a recognizing arrangement allowing the processor to recognize the congestion states of all processors. According to JP-A 8-287032, the communication management system is provided with a plurality of call processing processors for mainly controlling the exchange processing of a private branch exchange (PBX) and respective processors are mutually connected through communication lines so as to execute mutual communication. Each processor is provided with a recognizing arrangement allowing the processor to recognize the congestion states of all processors. The recognizing arrangement mutually transmits/receives congestion state information to/from recognizing arrangements in other processors through communication lines. Thereby each processor can recognize the congestion states of other processors, and when a certain processor in the system reaches a congestion state, the congestion state can be relieved by the mutual communication processing of respective processors before system transmission regulation is generated from a management processor.

Japanese Unexamined Patent, Publication (JP-A) of Tokkai No. Hei 10-65,728 or JP-A 10-65728 discloses a distribution processor-type data exchange where the processing ability of a whole system is improved. According to JP-A 10-65728, the exchange is provided with a node control processor (NCP) and a plurality of line containing processors (LCP) for executing the routing processing of a call. The node control processor controls the utilizing ratio of CPU of whole line containing processors and the processor number of the lowest CPU utilizing ratio is reported to whole line containing processors by multi-address communication. In the meantime, when a processing request is received, respective line containing processors shift the processing to the processor with the lower CPU utilizing ratio when the CPU utilizing ratio of itself is high.

Japanese Unexamined Patent Publication (JP-A) of Tokkai No. Hei 5-89,055 or JP-A 5-89055 discloses a packet exchange control system in a multi processor system, which is capable of performing the control of a data transfer phase by a multi processor system in one processor. According to JP-A 5-89055, by the transmitting and receiving of a route selection information (including transmitting side information and master deciding information) signal from a transmitting side function block at the time of setting a call and a connection completion (including transmitting side control request and receiving side information) signal from a receiving side function block, the transmitting side is decided to be a master. Subsequently, by making possible the transmitting and receiving of a signal of slave side receiving side function block at the time of a data transfer phase and a transmitting side function block, the control of a data transmitting requesting signal from both transmitting side and receiving side is performed at the transmitting side function block (master side).

SUMMARY OF THE INVENTION

It is therefore an object of this invention to provide a call distribution method which is capable of decreasing distribution for call processing execution processors in a selection processing execution processor.

It is another object of this invention to provide a call distribution method of the type described, which has no adverse effect on other call processing execution processors.

It is still another object of this invention to provide a call distribution method of the type described, which is capable of continuing a stable call processing operation.

Other objects of this invention will become clear as the description proceeds.

On describing the gist of an aspect of this invention, it is necessary to be understood that a method is for distributing calls in a radio exchanging station for use in a mobile communication system. The radio exchanging station comprises a selection processing execution processor and first through N-th call processing execution processors, where N represents a positive integer which is not less than two.

According to the aspect of this invention, an n-th call processing execution processor periodically delivers, to the selection processing execution processor, an n-th use condition signal indicative of an n-th use condition of an n-th radio resource managed by the n-th call processing execution processor and an n-th load condition signal indicative of an n-th load condition of the n-th call processing execution processor, where n represents each of 1 through N. On the basis of first through N-th use conditions and first through N-th load conditions, the selection processing execution processor determines first through N-th call reception permissible numbers for distributing to the first through the N-th call processing execution processors, respectively. In addition, the radio exchanging station may comprise only one call processing execution processor in lieu of a plurality of call processing execution stations.

DESCRIPTION OF THE PREFERRED EMBODIMENT

Figure 1:
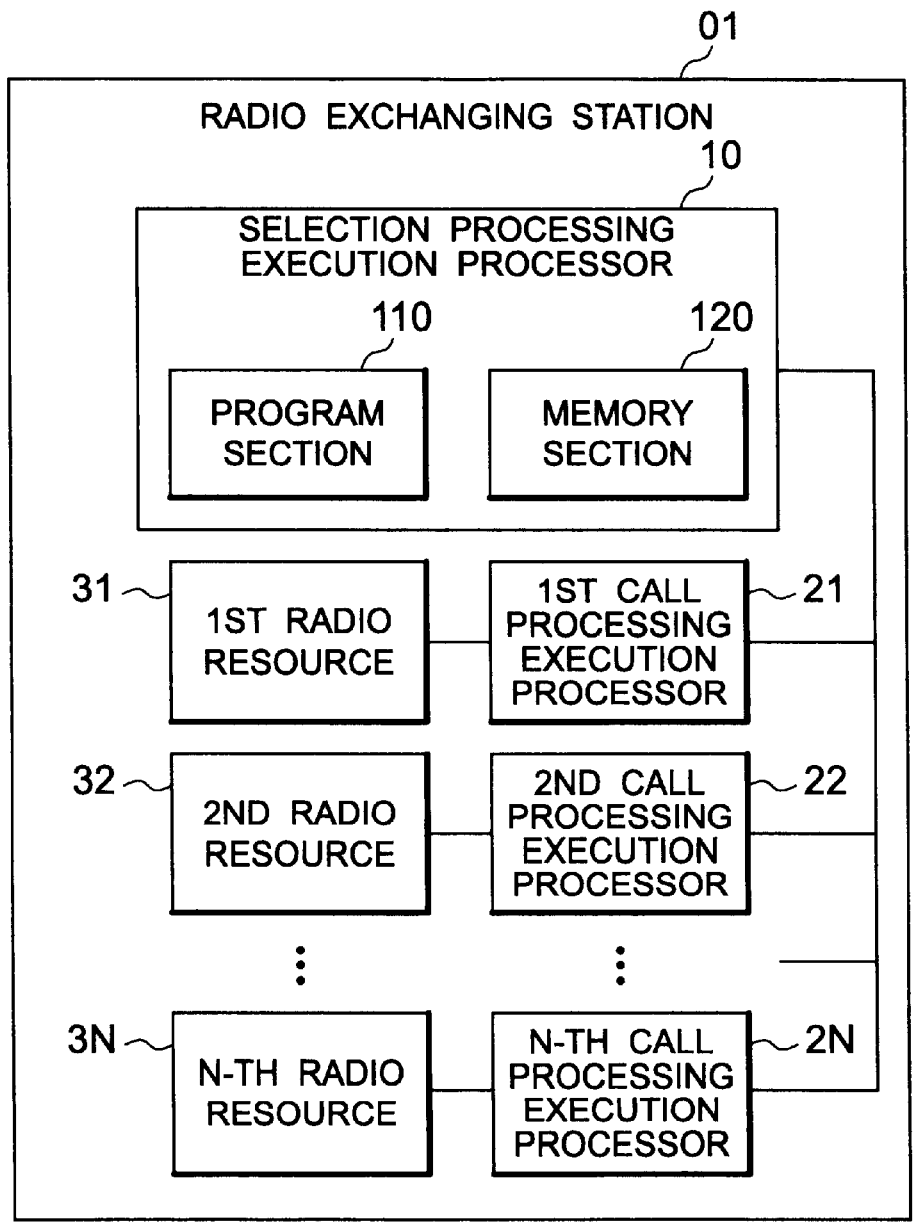
FIG. 1 is a block diagram of a radio exchanging station for use in a mobile communication system to which a call distribution method according to an embodiment of this invention is applicable.

Referring to FIG. 1, the description will proceed to a call distributing method in a radio exchanging station 01 for use in a mobile communication system according to an embodiment of this invention. FIG. 1 is a block diagram of the radio exchanging station 01 in the mobile communication system to which the call distribution method according to the embodiment of this invention is applicable. As illustrated in FIG. 1, the radio exchanging station 01 comprises a selection processing execution processor 10, first through N-th call processing execution processors 21, 22, . . . , and 2N which are connected to the selection processing execution processor 10, and first through N-th radio resources 31, 32, . . . , and 3N which are managed by the first through the N-th call processing execution processors 21 to 2N, respectively, where N represents a positive integer which is not less than two. In addition, the selection processing execution processor 10 comprises a program section 110 and a memory section 120.

Referring now to FIG. 1, the description will proceed to operation of the call distributing method according to the embodiment of this invention. An n-th call processing execution processor 2n periodically sends, to the selection processing execution processor 10, an n-th use condition signal indicative of an n-th use condition of an n-th radio resource 3n and an n-th load condition signal indicative of an n-th load condition of the n-th call processing execution processor 2n, where n represents each of 1 through N. On the basis of the first through the N-th use conditions and the first through the N-th load conditions, the selection processing execution processor 10 carries out distribution of a call in the manner which will later become clear.

Figure 2:
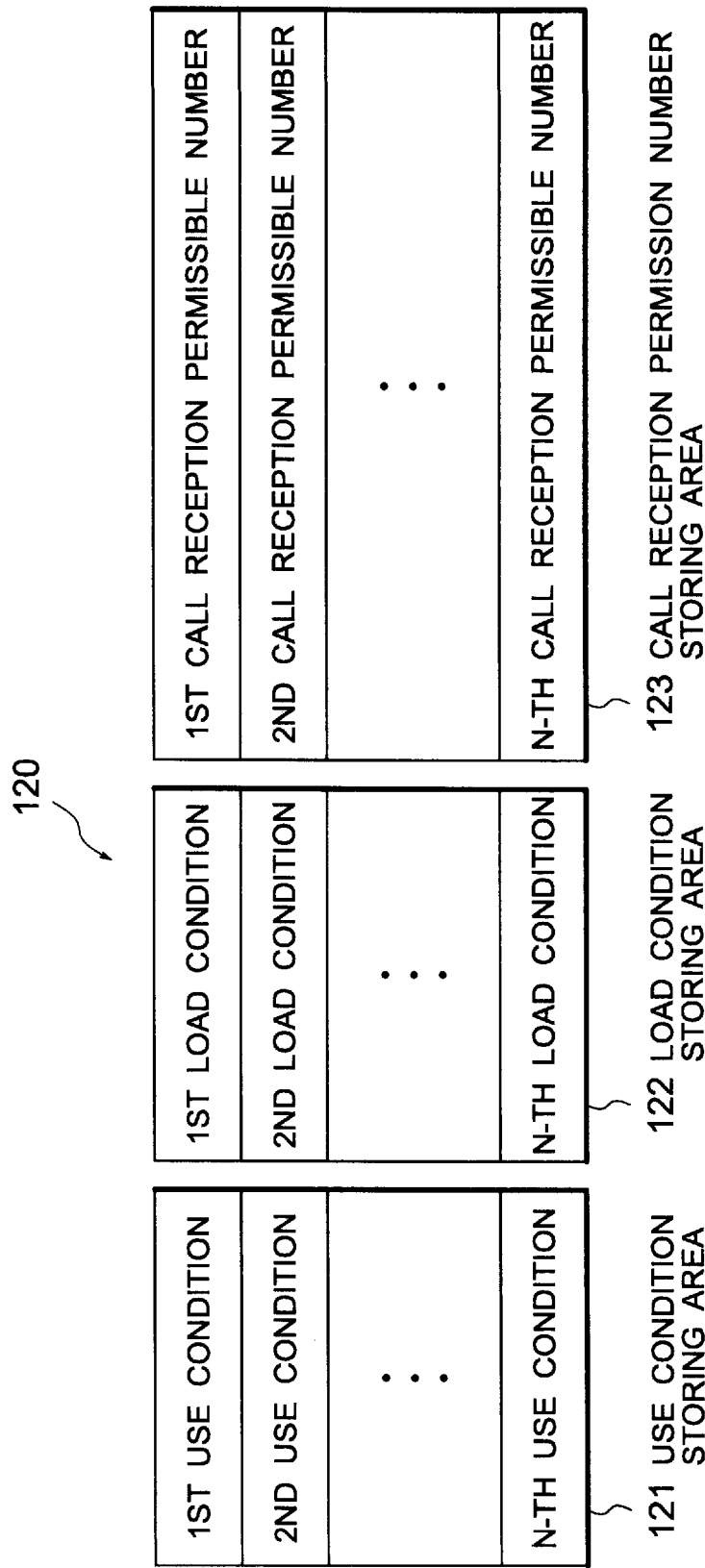
FIG. 2 is a block diagram of a memory section in a selection processing execution processor for use in the radio exchanging station illustrated in FIG. 1.

Turning to FIG. 2, the memory section 120 comprises a use condition storing area 121, a load condition storing area 122, and a call reception permissible number storing area 123. The use condition storing area 121 stores the first through the N-th use conditions indicated by the first through the N-th use condition signals. The load condition storing area 122 stores the first through the N-th load conditions indicated by the first through the N-th load condition signals. The call reception permissible number storing area 123 stores first through N-th call reception permissible numbers for the first through the N-th call processing execution processors 21 to 2N, respectively. The first through the N-th call reception permissible numbers are called first through N-th distribution limitation values, respectively.

Figure 3:
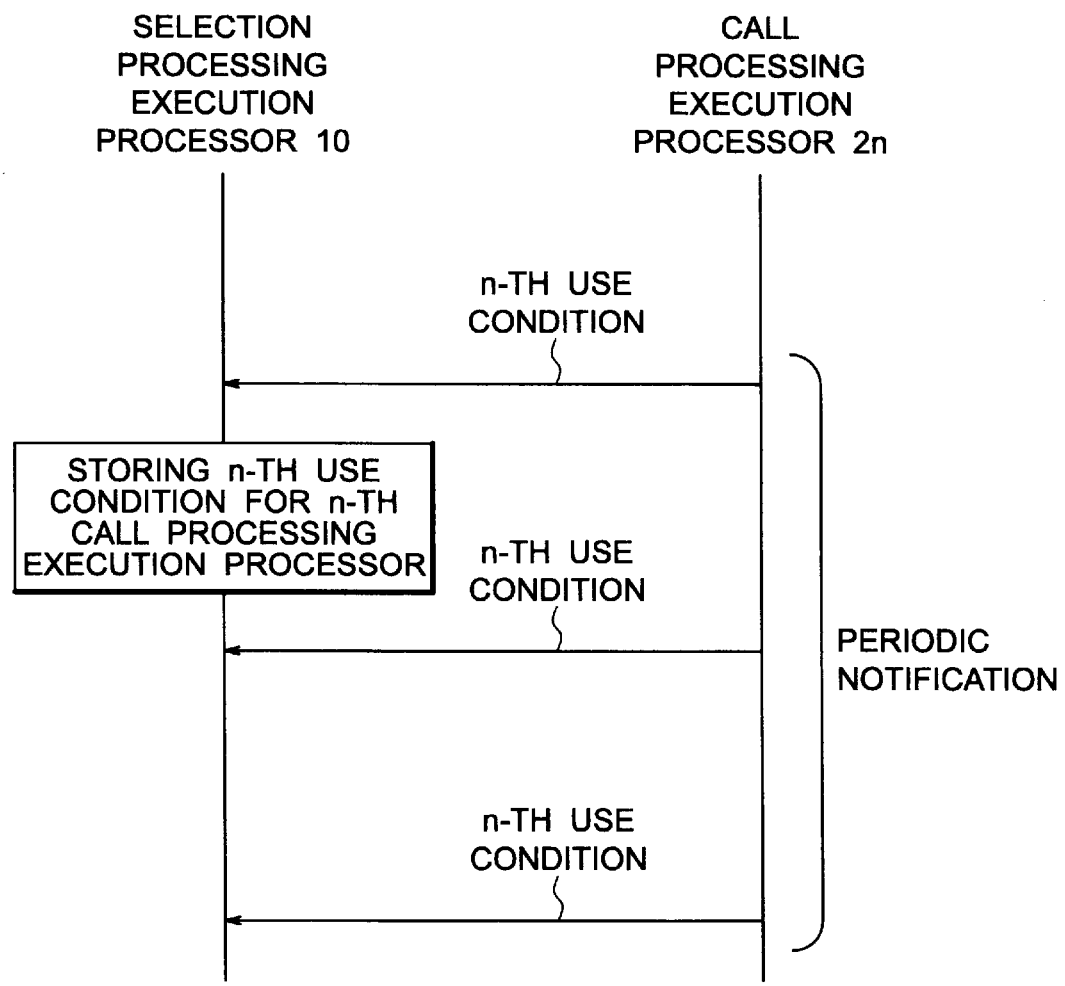
FIG. 3 is a flowchart for use in describing of operation of notification of an n-th use condition of an n-th radio resource managed by an n-th call processing execution processor for use in the radio exchanging station illustrated in FIG. 1.
Figure 4:
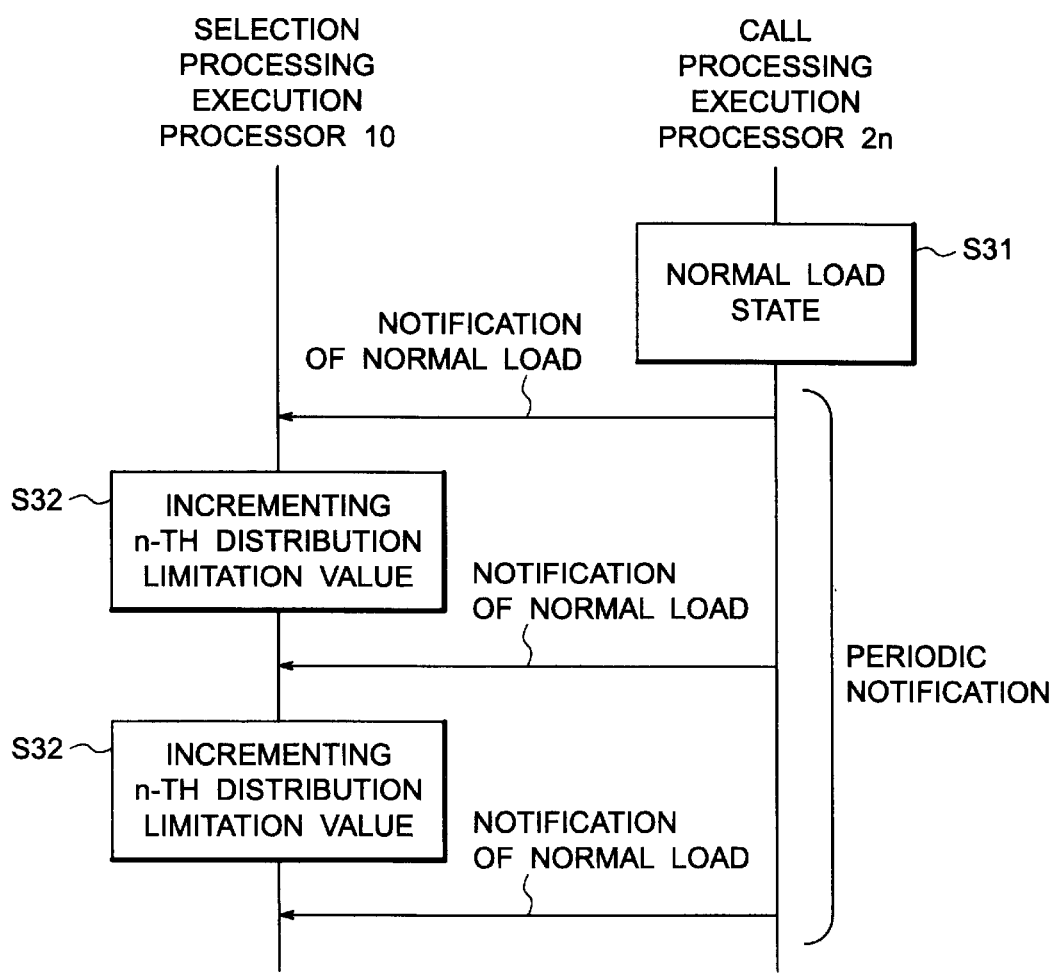
FIG. 4 is a flowchart for use in describing of operation of notification of a normal load state as an n-th load condition of the n-th call processing execution processor for use in the radio exchanging station illustrated in FIG. 1.
Figure 5:
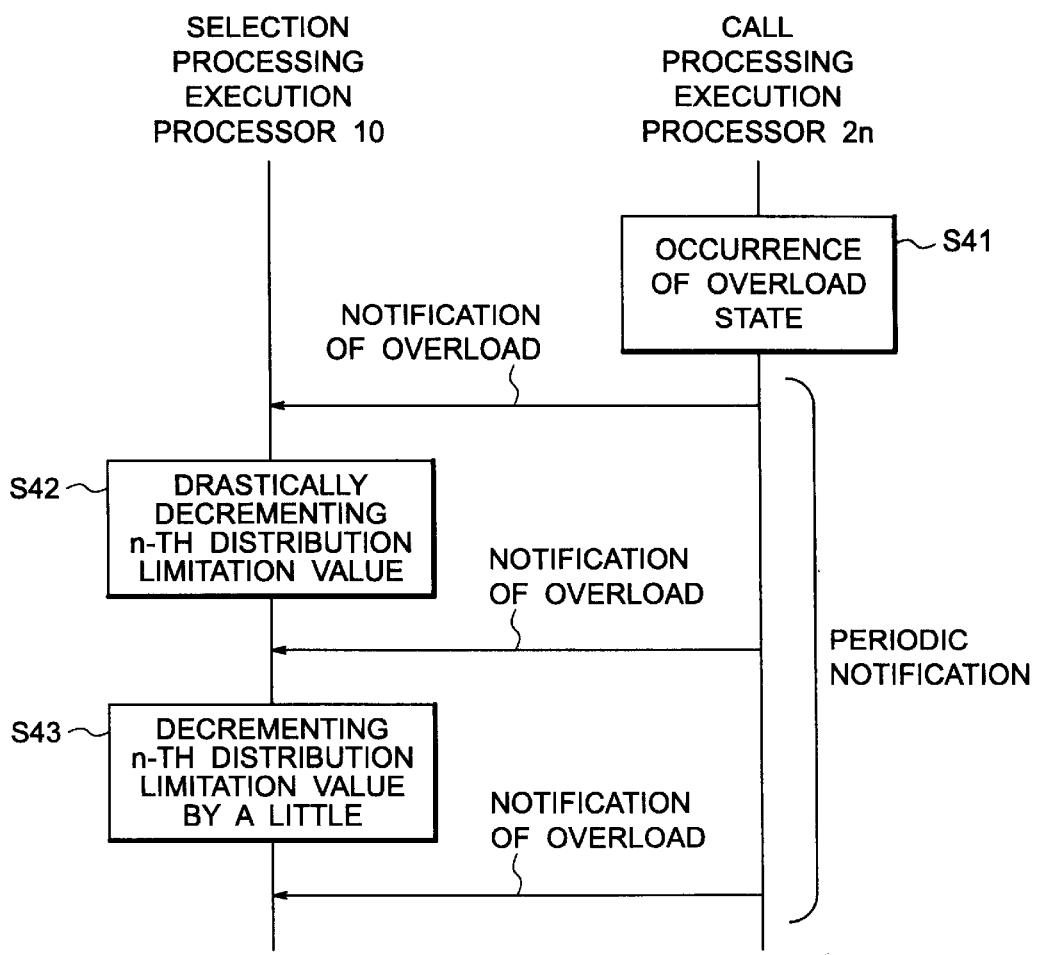
FIG. 5 is a flowchart for use in describing of operation of notification of an overload state as the n-th load condition of the n-th call processing execution processor for use in the radio exchanging station illustrated in FIG. 1.
Figure 6:
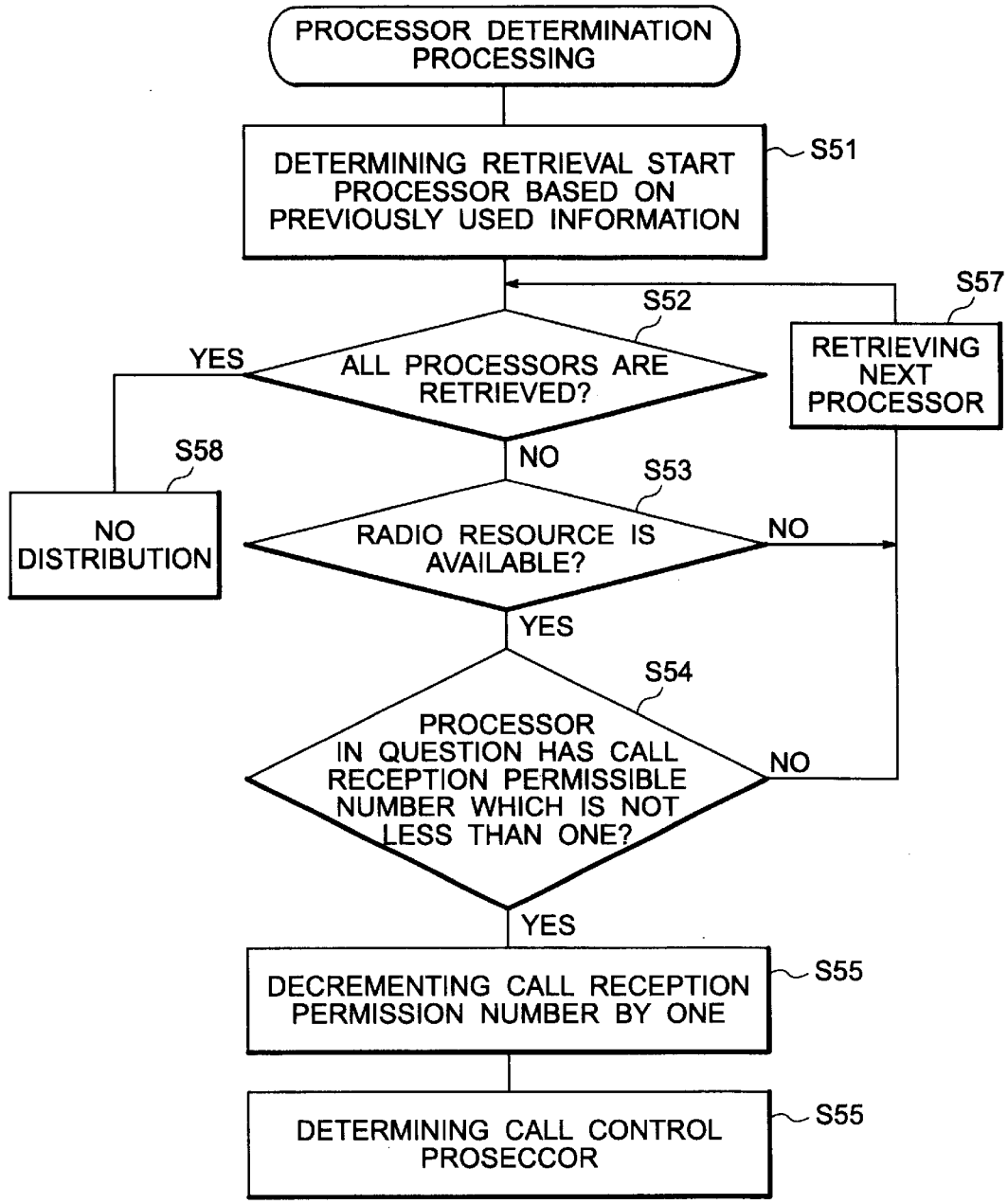
FIG. 6 is a flowchart for use in describing of operation of determining of a call control processor in the selection processing execution processor for use in the radio exchanging station illustrated in FIG. 1.

Referring now to FIGS. 3 through 6, the description will proceed to operation of the call distribution method of the radio exchanging station 01 in detail. FIG. 3 is a flowchart for use in describing of operation of notification of the n-th use condition of the n-th radio resource 3n. FIG. 4 is a flowchart for use in describing of operation of notification of a normal load state as the n-th load condition of the n-th call processing execution processor 2n. FIG. 5 is a flowchart for use in describing of operation of notification of an overload state as the n-th load condition of the n-th call processing execution processor 2n. FIG. 6 is a flowchart for use in describing of operation of determining of a call control processor. In addition, each of the first through the N-th call processing execution processors 21 to 2N has an overload threshold value and an overload release threshold value while the selection processing execution processor 10 has a reception permissible initial value.

Referring now to FIG. 3, the description will first proceed to operation on notification of the n-th use condition of the n-th radio resource 3n. FIG. 3 illustrates operation of delivering the n-th use condition signal indicative of the n-th use condition of the n-th radio resource from the n-th call processing execution processor 2n to the selection processing execution processor 10. The n-th use condition indicates one of a free or enable condition and a disable condition.

The n-th call processing execution processor 2n periodically delivers, to the selection processing execution processor 10, the n-th use condition signal indicative of the n-th use condition of the n-th radio resource 3n accommodated by the n-th call processing execution processor 2n. The selection processing execution processor 10 stores the n-th use condition of the n-th radio resource 3n for the n-th call processing execution processor 2n in the use condition storing area 121 of the memory section 120 at a step S21.

Referring to FIG. 4, the description will proceed to operation of notification of the normal load state on normal load. It will be assumed in the n-th call processing execution processor 2n that the processor load state is a normal load state or is less than the overload threshold value at a step S31. In this event, the n-th call processing execution processor 2n periodically delivers the n-th load condition signal indicative of the normal load state to the selection processing execution processor 10. Responsive to the n-th load condition signal indicative of the normal load state, the selection processing execution processor 10 increments the n-th call reception permissible number within a predetermined range at a step S32.

Referring to FIG. 5, the description will proceed to operation of notification of the overload state on overload. It will be presumed in the n-th call processing execution processor 2n that the processor load state exceeds the overload threshold value at a step S41. Under the circumstances, the n-th call processing execution processor 2n periodically delivers the n-th load condition signal indicative of the overload state to the selection processing execution processor 10. Responsive to the n-th load condition signal indicative of the overload state, the selection processing execution processor 10 drastically decrements the n-th call reception permissible number in a case where the n-th load condition signal indicative of the overload state is a state transition from the normal load state to the overload at a step S42. Thereafter, responsive to the n-th load condition signal indicative of the overload state, the selection processing execution processor 10 decrements the n-th call reception permissible number by a little at a step S43.

Referring to FIG. 6, the description will proceed to operation of determining of the call control processor. FIG. 6 illustrates operation of determining of the call control processor in the selection processing execution processor 10.

When a call control request is made to the selection processing execution processor 10, the selection processing execution processor 10 provisionally determines, as a current provisional determined call processing execution processor, the next call processing execution processor succeeded by the last distributed call processing execution processor at a step S51. The step S51 is followed by a step S52 at which the selection processing execution processor 10 determines whether or not all of the first through the N-th call processing execution processors 21 to 2N are retrieved. In as much as all of the first through the N-th call processing execution processors 21 to 2N are not retrieve in this time instant, the step S52 proceeds to a step S53 at which the selection processing execution processor 10 determines whether or not the radio resource of the current provisional determined call processing execution processor is available or enable. When the radio resource of the current provisional determined call processing execution processor is available or enable, the step S53 is succeeded by a step S54 at which the selection processing execution processor 10 determines whether or not the,current provisional determined call processing execution processor has the call reception permissible number which is not less than one.

When the call reception permissible number of the current provisional determined call processing execution processor is not less than one, the step S54 is followed by steps S55 and S56 at which the selection processing execution processor 10 decrements the call reception permissible number of the current provisional determined call processing execution processor by one and determines the current provisional determined call processing execution processor as a truly determined call processing execution processor.

When the radio resource of the current provisional determined call processing execution processor is disable or when the call reception permissible number of the current provisional determined call processing execution processor is zero, each of the steps S53 and S54 is succeeded by a step S57 at which the selection processing execution processor 10 retrieves the next provisional determined call processing execution processor which follows the current provisional determined call processing execution processor. The selection processing execution processor 10 turns a processing from the step S57 back to the step S52. That is, a similar check processing is made as regards to the next provisional determined call processing execution processor.

When all of the first through the N-th call processing execution processor 21 to 2N are retrieved, the step S52 proceeds to a step S58 at which the selection processing execution processor 10 does not carry out a call distribution.

In the manner which is described above, a retrieval processing is carried out until an available processor is determined.

As described above, according to this invention, the radio exchanging station 01 carries out the call distribution processing by determining the first through the N-th load conditions of the first through the N-th call processing execution processors 21 to 2N and the first through the N-th use conditions of the first through the N-th radio resources 31 to 3N. As a result, it is possible to relax congestion of traffic and to realize the system having superior stability.

While this invention has thus far been described in conjunction with the preferred embodiment thereof, it will now be readily possible for those skilled in the art to put this invention into various other manners. For example, the radio exchanging station may comprise only one call processing execution processor although the radio exchanging station according to the above-mentioned embodiment comprises a plurality of call processing execution processors.

What is claimed is:

1. A method of distributing calls in a radio exchanging station for use in a mobile communication system, said radio exchanging station comprising a selection processing execution processor and first through N-th call processing execution processors, where N represents a positive integer which is not less than two, said method comprising the steps of:

periodically delivering, from an n-th call processing execution processor to said selection processing execution processor, an n-th use condition signal indicative of an n-th use condition of an n-th radio resource managed by said n-th call processing execution processor and an n-th load condition signal indicative of an n-th load condition of said n-th call processing execution processor, where n represents each of 1 through N; and determining, in said selection processing execution processor, on the basis of first through N-th use conditions and first through N-th load conditions, first through N-th call reception permissible numbers for distributing to said first through said N-th call processing execution processors, respectively.

2. A method as claimed in claim 1, wherein said n-th call processing execution processor compares the n-th load condition of said n-th call processing execution processor with a predetermined overload threshold value, said n-th call processing execution processor sending the n-th load condition signal indicative of a normal load state to said selection processing execution processor when the n-th load condition of said n-th call processing execution processor is not more than the predetermined overload threshold value.

3. A method as claimed in claim 2, wherein said selection processing execution processor increments an n-th call reception permissible number within a predetermined range in response to the n-th load condition signal indicative of the normal load state.

4. A method as claimed in claim 1, wherein said n-th call processing execution processor compares the n-th load condition of said n-th call processing execution processor with a predetermined overload threshold value, said n-th call processing execution processor sending the n-th load condition signal indicative of an overload state to said selection processing execution processor when the n-th load condition of said n-th call processing execution processor exceeds the predetermined overload threshold value.

5. A method as claimed in claim 4, wherein said selection processing execution processor decrements an n-th call reception permissible number in response to the n-th load condition signal indicative of the overload state.

6. A method as claimed in claim 5, wherein said selection processing execution processor drastically decrements the n-th call reception permissible number in response to the n-th load condition signal indicative of the overload state which is a state transition from the normal load state to the overload state, thereafter, the selection processing execution processor 10 decrements, in response to the n-th load condition signal indicative of the overload state, the n-th call reception permissible number by a little.

7. A method as claimed in claim 1, wherein said selection processing execution processor provisionally determines, in response to a call control request, the next call processing execution processor succeeded by the last distributed call processing execution processor as a current provisional determined call processing execution processor.

8. A method as claimed in claim 7, wherein when the radio resource of the current provisional determined call processing execution processor is enable and when the current provisional determined call processing execution processor has the call reception permissible number which is not less than one, said selection processing execution processor determines the current provisional determined call processing execution processor as a truly determined call processing execution processor.

9. A method as claimed in claim 7, wherein when the radio resource of the current provisional determined call processing execution processor is disable or when the current provisional determined call processing execution processor has the call reception permissible number of zero, said selection processing execution processor retrieves the next provisional determined call processing execution processor which follows the current provisional determined call processing execution processor.

10. A method of distributing calls in a radio exchanging station for use in a mobile communication system, said radio exchanging station comprising a selection processing execution processor and a call processing execution processor, said method comprising the steps of:

periodically delivering, from said call processing execution processor to said selection processing execution processor, a use condition signal indicative of a use condition of a radio resource managed by said call processing execution processor and a load condition signal indicative of a load condition of said call processing execution processor; and determining, in said selection processing execution processor, on the basis of said use condition and said load condition, a call reception permissible number for distributing to said call processing execution processor.

11. A method as claimed in claim 10, wherein said call processing execution processor compares the load condition of said call processing execution processor with a predetermined overload threshold value, said call processing execution processor sending the load condition signal indicative of a normal load state to said selection processing execution processor when the load condition of said call processing execution processor is not more than the predetermined overload threshold value.

12. A method as claimed in claim 11, wherein said selection processing execution processor increments a call reception permissible number within a predetermined range in response to the load condition signal indicative of the normal load state.

13. A method as claimed in claim 10, wherein said call processing execution processor compares the load condition of said call processing execution processor with a predetermined overload threshold value, said call processing execution processor sending the load condition signal indicative of an overload state to said selection processing execution processor when the load condition of said call processing execution processor exceeds the predetermined overload threshold value.

14. A method as claimed in claim 13, wherein said selection processing execution processor decrements a call reception permissible number in response to the load condition signal indicative of the overload state.

15. A method as claimed in claim 14, wherein said selection processing execution processor drastically decrements the call reception permissible number in response to the load condition signal indicative of the overload state which is a state transition from the normal load state to the overload state, thereafter, the selection processing execution processor decrements, in response to the load condition signal indicative of the overload state, the call reception permissible number by a little.

* * * * *